(12) United States Patent
Oonishi (10) Patent No.: US 10,095,223 B2
(45) Date of Patent: Oct. 9, 2018

(54) NUMERICAL CONTROLLER HAVING FUNCTION OF SPEEDING UP FIXED CYCLE

(71) Applicant: FANUC CORPORATION, Minamitsuru-gun, Yamanashi (JP)

(72) Inventor: Nobuhito Oonishi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 86 days.

(21) Appl. No.: 15/461,066

(22) Filed: Mar. 16, 2017

(65) Prior Publication Data

US 2017/0269576 A1 Sep. 21, 2017

(30) Foreign Application Priority Data

Mar. 18, 2016 (JP) ................................. 2016-055839

(51) Int. Cl.
*G05B 19/416* (2006.01)
*G05B 19/18* (2006.01)

(52) U.S. Cl.
CPC ......... *G05B 19/416* (2013.01); *G05B 19/182* (2013.01); *G05B 2219/45044* (2013.01)

(58) Field of Classification Search
CPC ................ G05B 19/416; G05B 19/182; G05B 2219/45044
See application file for complete search history.

(56) References Cited

U.S. PATENT DOCUMENTS

| 4,719,579 A * | 1/1988 | Niwa ................... G05B 19/408 318/561 |
| 5,532,933 A * | 7/1996 | Nakata ............... G05B 19/4099 700/182 |
| 6,591,158 B1 * | 7/2003 | Bieterman ............. G05B 19/41 700/169 |
| 6,745,100 B1 * | 6/2004 | Lermuzeaux ...... G05B 19/4097 700/159 |

(Continued)

FOREIGN PATENT DOCUMENTS

| JP | S60114911 A | 6/1985 |
| JP | S6374550 A | 4/1988 |

(Continued)

OTHER PUBLICATIONS

Notification of Reasons for Refusal for Japanese Application No. 2016-055839, dated Mar. 6, 2018, including English translation, 4 pages.

*Primary Examiner* — Christopher E. Everett
(74) *Attorney, Agent, or Firm* — RatnerPrestia (57) ABSTRACT

A numerical controller has a fixed cycle operation section that analyzes a fixed cycle command and generates a command data string based on the analysis result. The fixed cycle operation section includes a remainder calculation section that calculates a remaining cutting depth based on an entire cutting depth of a tool for a workpiece and a cutting depth of the tool for the workpiece in one cut that are specified by the fixed cycle command, and a command data string adjustment section that adjusts order of command data items (Continued)

q: CUTTING DEPTH
q': CUTTING DEPTH (REMAINDER)
d: RETURN AMOUNT

--> FAST FEED
→ CUTTING FEED included in the command data string or a cutting depth in each of the command data items based on the remaining cutting depth such that the total of a feed movement amount of the tool resulting from the command data string is reduced.

4 Claims, 11 Drawing Sheets

(56) References Cited

U.S. PATENT DOCUMENTS

| | | | | |
|---|---|---|---|---|
| 7,287,939 | B2 * | 10/2007 | Koch | G05B 19/182 29/889.7 |
| 2002/0164221 | A1 * | 11/2002 | Izutsu | G05B 19/4166 409/132 |
| 2005/0246052 | A1 * | 11/2005 | Coleman | G05B 19/40937 700/188 |
| 2007/0179661 | A1 * | 8/2007 | Onozuka | G05B 19/40937 700/173 |
| 2010/0087949 | A1 * | 4/2010 | Coleman | G05B 19/40937 700/189 |
| 2014/0180465 | A1 * | 6/2014 | Nakano | G05B 19/4097 700/160 |
| 2014/0297021 | A1 * | 10/2014 | Aggarwal | G05B 19/40937 700/160 |
| 2015/0127139 | A1 * | 5/2015 | Bolin | G05B 19/4065 700/173 |

FOREIGN PATENT DOCUMENTS

| | | |
|---|---|---|
| JP | 2000-105606 A | 4/2000 |
| JP | 2000280200 A | 10/2000 |

* cited by examiner

FIG. 1A q: CUTTING DEPTH
q': CUTTING DEPTH (REMAINDER)
d: RETURN AMOUNT

- -> FAST FEED
—> CUTTING FEED

FIG. 1B q: CUTTING DEPTH
q': CUTTING DEPTH (REMAINDER)
d: RETURN AMOUNT

- -> FAST FEED
—> CUTTING FEED

FIG. 2A q: CUTTING DEPTH
q': CUTTING DEPTH (REMAINDER)
d: RETURN AMOUNT

--> FAST FEED
→ CUTTING FEED

FIG. 2B q+a: CUTTING DEPTH
q'-2a: CUTTING DEPTH (REMAINDER)
d: RETURN AMOUNT

--> FAST FEED
→ CUTTING FEED

FIG. 3A q: CUTTING DEPTH
q': CUTTING DEPTH (REMAINDER)
d: RETURN AMOUNT

--> FAST FEED
→ CUTTING FEED

FIG. 3B q+q'/2: CUTTING DEPTH
d: RETURN AMOUNT

--> FAST FEED
→ CUTTING FEED

FIG. 4A q: CUTTING DEPTH
q': CUTTING DEPTH (REMAINDER)
d: RETURN AMOUNT

- -> FAST FEED
⟶ CUTTING FEED

FIG. 4B q, q+q': CUTTING DEPTH
d: RETURN AMOUNT

- -> FAST FEED
⟶ CUTTING FEED

NUMERICAL CONTROLLER HAVING FUNCTION OF SPEEDING UP FIXED CYCLE

BACKGROUND OF THE INVENTION

1. Field of the Invention

The present invention relates to a numerical controller, and particularly relates to a numerical controller having a speedup function by order change or redistribution of a remainder step in a fixed cycle.

2. Description of the Related Art

Figure 10:
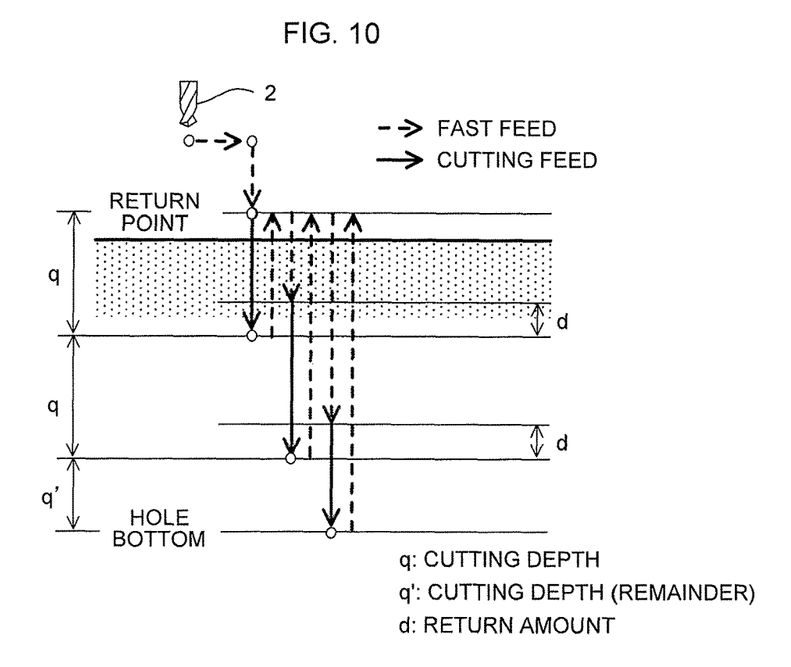
FIG. 10 is a view showing an operation pattern of hole drilling by a deep hole drilling cycle performed in the numerical controller.

Conventionally, an example of an operation pattern of hole drilling that is performed using a numerical controller includes a deep hole drilling cycle shown in FIG. 10. This hole drilling cycle performs the following operations.

Operation 1: a drill 2 is fed by a cutting depth q at a specific cutting speed.

Operation 2: the drill 2 is returned to a return point from an end point of Operation 1 by fast feed.

Operation 3: for the next cut, the drill 2 is fed by the fast feed from the return point to a position located before the previous cut endpoint (in Operation 1) by a return amount d (that is set using a parameter or by setting).

Operation 4: the drill 2 is fed by an amount d+q from the end position of the fast feed at the specific cutting speed.

Operation 5: Operations 2 to 4 are repeated.

Operation 6: when the drill 2 reaches a hole bottom during the cut, the cut is ended.

Operation 7: the drill 2 is returned to the return point by the fast feed.

It is possible to perform the above-described deep hole drilling cycle by a command using the following codes.

G83 Xx Yy Zz Rr Qq Ff;

In the above command, each of x, y, z, r, q, and f indicates a data value, X and Y indicate coordinates of a position on an XY plane where hole drilling is performed, Z indicates a coordinate of a position of the hole bottom in the hole drilling, R indicates a coordinate of a position of the return point, Q indicates the cutting depth, and F indicates a feed speed.

The deep hole drilling cycle is used when a deep hole is formed in a workpiece, and is characterized in that the deep hole is formed by intermittently performing cutting feed up to the hole bottom while chips are discharged to the outside.

As a method for reducing execution time of the fixed cycle described above, it is conceivable to change the cutting depth. For example, in a technique disclosed in Japanese Patent Application Laid-open No. 2000-105606, the number of times of a cut operation is reduced by increasing the cutting depth, and the execution time is thereby reduced.

Figure 11:
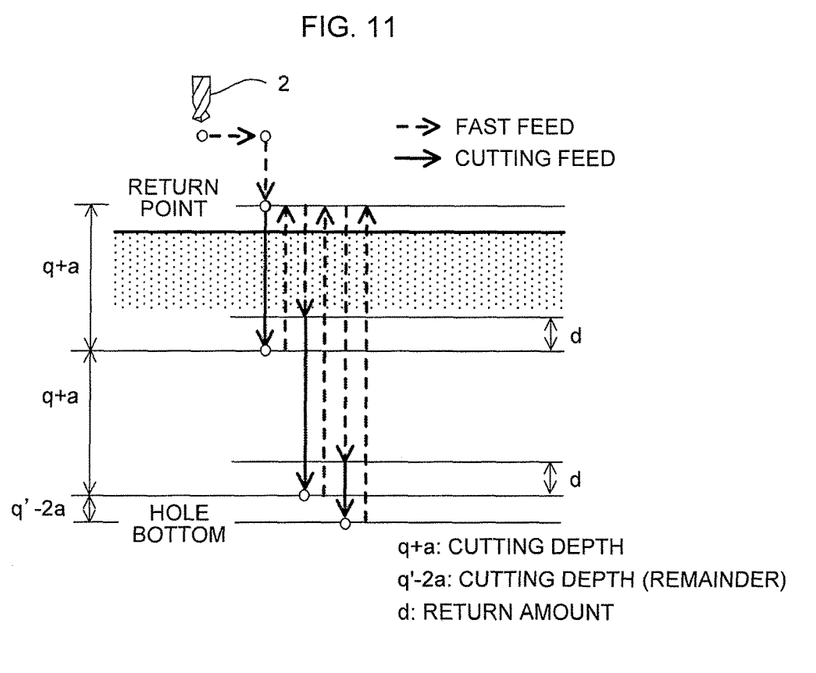
FIG. 11 is a view for explaining the case where the cutting depth in each step is increased in FIG. 10.

In the case where, e.g., the number of times of the cut operation is not changed when the cutting depth is increased by using the technique disclosed in Japanese Patent Application Laid-open No. 2000-105606, a problem arises in that, instead of reducing the execution time, the execution time is increased correspondingly to an increase in the distance of a fast feed operation. FIG. 11 shows the operation in the case where the cutting depth is increased from the setting in FIG. 10 by a.

The total of the movement distance of the cutting of each of the operation of the deep hole drilling cycle in FIG. 10 and the operation of the deep hole drilling cycle in FIG. 11 is $2q+q'+2d$. However, the total of the movement distance of the fast feed in the case of FIG. 10 is $$q+(q-d)+2q+(2q-d)+(2q+q')=8q+q'-2d,$$

while the total thereof in the case of FIG. 11 is $$(q+a)+(q+a-d)+2(q+a)+(2(q+a)-d)+(2q+q')=8q+q'-2d+6a,$$

and it can be seen that the movement distance is increased by 6a by increasing the cutting depth by a, and the execution time is increased correspondingly.

SUMMARY OF THE INVENTION

To cope with this, an object of the present invention is to provide a numerical controller having a speedup function by adjusting each step of the fixed cycle.

In the present invention, the above problem is solved by providing a functional unit that reduces the execution time of the fixed cycle by adjusting the execution order of the individual steps of the fixed cycle or adjusting the cutting depth in each step in the numerical controller.

A numerical controller according to the present invention generates a command data string including a plurality of command data items based on a fixed cycle command included in a program, and controls a machine based on the command data string. The numerical controller includes a fixed cycle operation section that analyzes the fixed cycle command and generates the command data string based on an analysis result. The fixed cycle operation section includes a remainder calculation section that calculates a remaining cutting depth based on an entire cutting depth of a tool for a workpiece and a cutting depth of the tool for the workpiece in one cut that are specified by the fixed cycle command, and a command data string adjustment section that adjusts order of the command data items included in the command data string or cutting depths in the command data items based on the remaining cutting depth such that the total of a feed movement amount of the tool resulting from the command data string is reduced.

The command data string adjustment section may include an order change section that changes the order of the command data items included in the command data string such that command data that orders cutting feed by the remaining cutting depth is executed first.

The command data string adjustment section may include a remainder redistribution section that, in a case where the remaining cutting depth does not exceed a preset first threshold value, distributes the remaining cutting depth to command data that orders cutting feed by the cutting depth of the tool for the workpiece in one cut specified by the fixed cycle command.

The command data string adjustment section may include a remainder redistribution section that measures a load torque of a spindle motor to which the tool is attached when last command data item of the command data string is executed, and adds the remaining cutting depth to a cutting depth in the last command data item in a range in which the load torque does not exceed a preset second threshold value.

According to the present invention, it is possible to reduce the movement distance of the fast feed even when an operator does not change the cutting depth consciously, and reduce the execution time, and hence, even in the case where the number of times of the cut operation is not changed when the cutting depth is increased, the movement distance of the fast feed is reduced, and it is possible to reduce the execution time. In addition, a remainder step is redistributed when the remainder step can be redistributed, and hence it is possible to reduce the number of times of the cut in the fixed cycle as compared with the conventional operation, and it is possible to reduce the execution time.

DETAILED DESCRIPTION OF THE PREFERRED EMBODIMENTS

A numerical controller of the present invention reduces execution time of a fixed cycle by adjusting execution order of individual steps of the fixed cycle or a cutting depth in each step thereof such that the movement amount of a tool is minimized when the numerical controller executes a fixed cycle command.

An adjustment method of the execution order of the individual steps of the fixed cycle by the numerical controller of the present invention will be described by using FIGS. 1A and 1B.

Figure 1A:
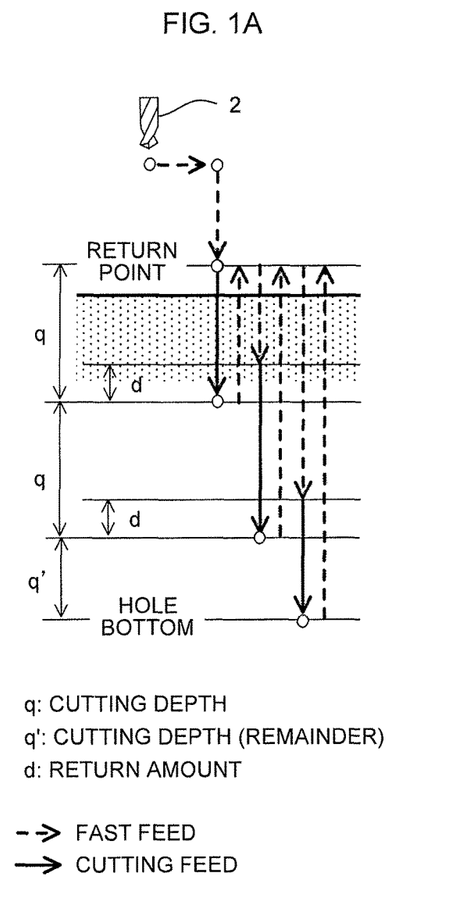
FIGS. 1A and 1B are views for explaining an adjustment method of execution order of individual steps in a fixed cycle by a numerical controller of the present invention.
Figure 1B:
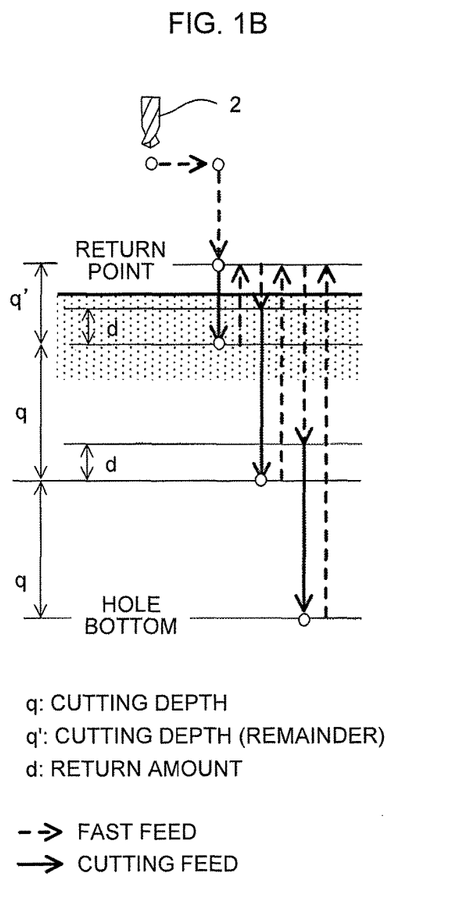

FIG. 1A shows a cut operation by a usual deep hole drilling cycle command in the case where the cutting depth of a drill 2 is set to q (the cutting depth of the drill 2 in a remainder step is q') and, in FIG. 1B, the cutting depth is not changed from that in FIG. 1A but the execution order is changed such that the remainder step is executed first. At this point, the total of the movement distance of cutting of the drill 2 in each of the case of FIG. 1A and the case of FIG. 1B in which the execution order is changed is 2q+q'+2d. However, the total of the movement distance of fast feed in the case of FIG. 1A is $$q+(q-d)+2q+(2q-d)+(2q+q')=8q+q'-2d,$$

while the total thereof in the case of FIG. 1B is $$q'+(q'-d)+(q'+q)+(q'+q-d)+(q'+2q)=4q+5q'-2d,$$

the movement distance in the case of FIG. 1B is shorter than that in the case of FIG. 1A by 4(q−q'), and it is possible to reduce the execution time. The effect of speedup by using this method is a reduction in movement distance corresponding to 2n(q−q') in general when it is assumed that the number of steps of hole drilling is n.

Figure 2A:
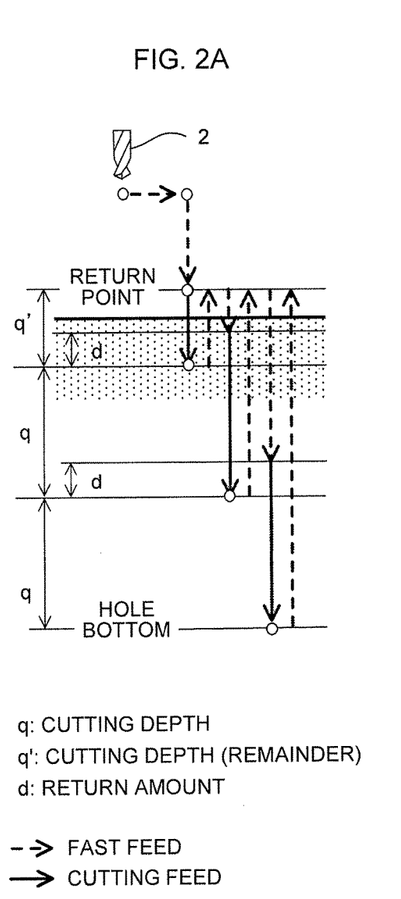
FIGS. 2A and 2B are views for explaining the case where a cutting depth in each step is increased in FIGS. 1A and 13.
Figure 2B:
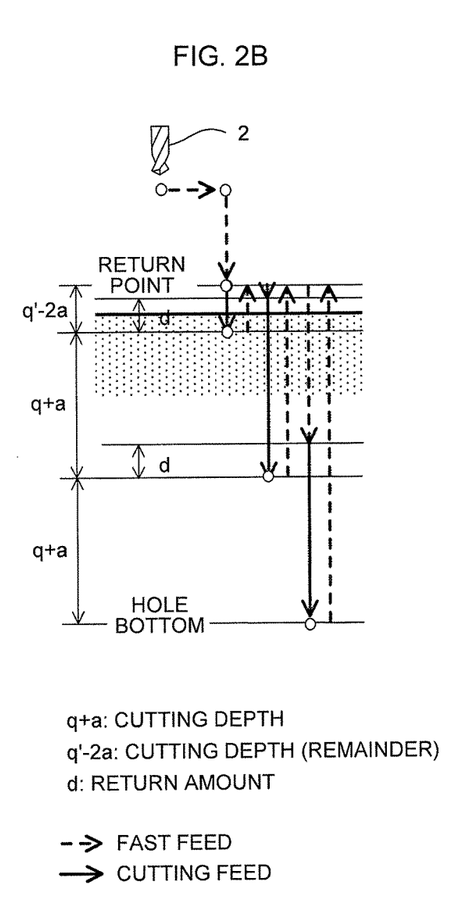

FIGS. 2A and 2B are views for explaining the case where the cutting depth is increased after the execution order of the individual steps of the fixed cycle is adjusted by the numerical controller of the present invention.

In the case where the execution order of the individual steps of the fixed cycle is adjusted by the above-described method and the remainder step is executed first, even when the cutting depth is increased and the number of times of the cut operation is not changed, the movement distance of the fast feed is reduced, and it is possible to reduce the execution time.

FIG. 2A shows the cut operation by the deep hole drilling cycle command when the remainder step is executed first in the case where the cutting depth of the drill 2 is set to q (the cutting depth of the drill 2 in the remainder step is q'), and FIG. 2B shows the case where the cutting depth is increased by a from the setting in FIG. 2A.

At this point, the total of the movement distance of the cutting in each of the case of FIG. 2A and the case of FIG. 2B in which the cutting depth is increased by a is 2q+q'+2d. However, the total of the movement distance of the fast feed in the case of FIG. 2A is $$q'+(q'-d)+(q'+q)+(q'+q-d)+(q'+2q)=4q+5q'-2d,$$

while the total thereof in the case of FIG. 2B is $$(q'-2a)+(q'-2a-d)+((q')+(q+a))+((q'-2a)+(q+a)-d)+(q'+2q)=4q+5q'-2d-6a,$$

and it can be seen that the movement distance in the case of FIG. 2B is shorter than that in the case of FIG. 2A by 6a, and it is possible to reduce the execution time. The effect of the speedup by using this method is a reduction in movement distance corresponding to n(n−1)a in general when it is assumed that the number of steps of the hole drilling is n. Note that, as long as the remainder step is not executed last, the movement distance of the fast feed is reduced as compared with the case where a usual fixed cycle is executed, and hence the remainder step does not necessarily need to be executed first. However, when the remainder step is executed earlier in the execution order, the total of the movement distance of the fast feed becomes shorter, and hence it is advisable to execute the remainder step at the earliest possible stage as far as the situation allows.

Next, an adjustment method of the cutting depth in each step of the fixed cycle by the numerical controller of the present invention will be described by using FIGS. 3A and 3B.

Figure 3A:
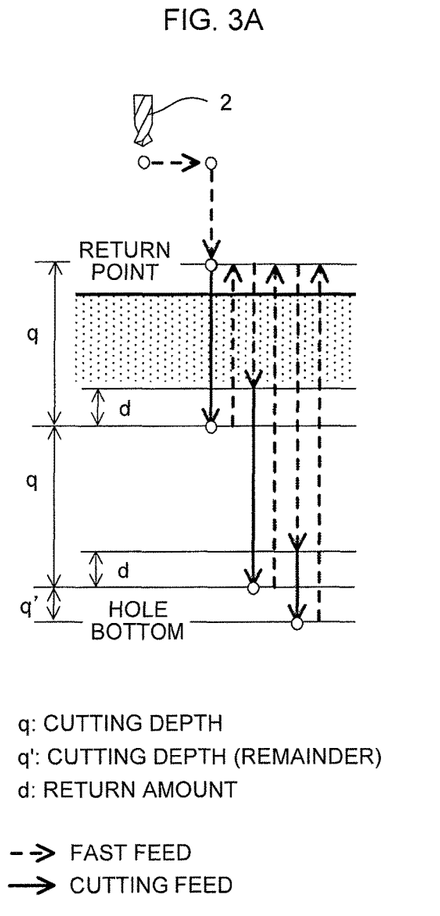
FIGS. 3A and 3B are views for explaining an adjustment method of the cutting depth in each step of a fixed cycle by the numerical controller of the present invention.

FIG. 3A shows the cut operation by the usual deep hole drilling cycle command in the case where the cutting depth of the drill 2 is set to q (the cutting depth of the drill 2 in the remainder step is q').

Figure 3B:
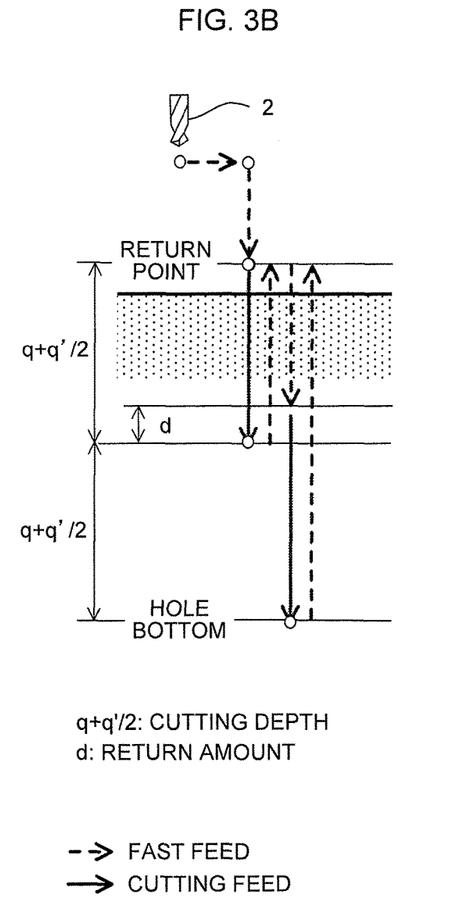

In the numerical controller of the present invention, by setting a threshold value a of the remainder in advance, in the case where the cutting depth q' in the remainder step is less than the threshold value a, the remainder step is redistributed to other usual steps. For example, in FIG. 3A, the remaining cutting depth q' is compared with the threshold value a and, in the case where the remaining cutting depth q' is less than the threshold value a, as shown in FIG. 3B, the remaining cutting depth q' is equally distributed to other steps in the numerical controller of the present invention. At this point, the total of the movement distance of the cutting in the case of FIG. 3A is $$q+(d+q)+(d+q')=2q+q'+2d,$$

while the total thereof in the case of FIG. 3B is $$(q+q'/2)+(d+q+q'/2)=2q+q'+d,$$

and the total of the movement distance of the cutting in the case of FIG. 3B is shorter than that in the case of FIG. 3A by d. In addition, the total of the movement distance of the fast feed in the case of FIG. 3A is $$q+(q-d)+2q+(2q-d)+(2q+q')=8q+q'-2d,$$

while the total thereof in the case of FIG. 3B is $$(q+q'/2)+(q+q'/2-d)+(2q+q')=4q+2q'-d,$$

and the movement distance in the case of FIG. 3B is shorter than that in the case of FIG. 3A by 4q−q'−d.

Thus, it is possible to reduce the execution time of the fixed cycle correspondingly to reductions in the movement distance of the cutting and the movement distance of the fast feed.

Note that the remaining cutting depth step does not necessarily need to be equally distributed to other steps, and all of the cutting depth thereof may be added to the last step, or a small cutting depth may be distributed to the first step and a large cutting depth may be distributed to the subsequent step.

Figure 4A:
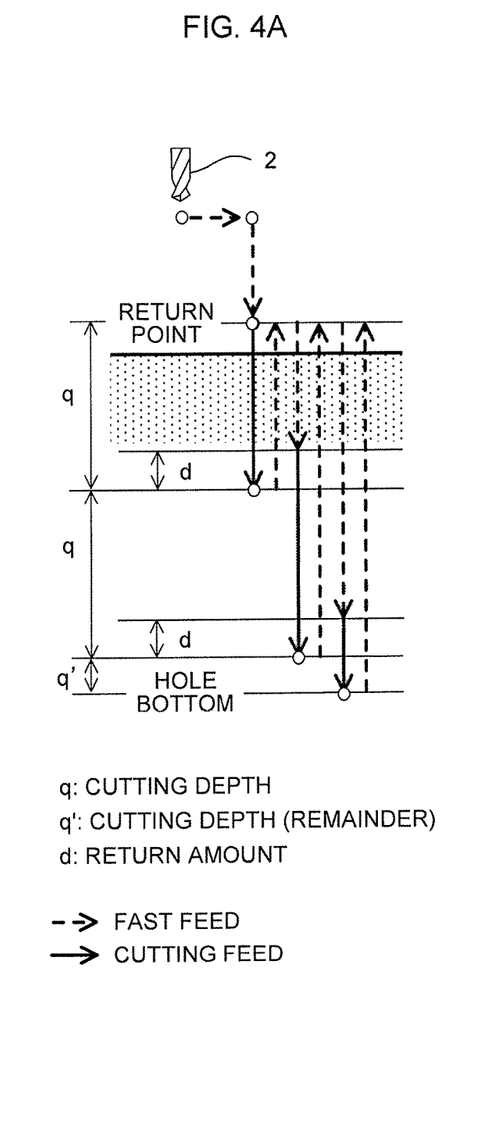
FIGS. 4A and 4B are views for explaining another adjustment method of the cutting depth in each step of the fixed cycle by the numerical controller of the present invention.
Figure 4B:
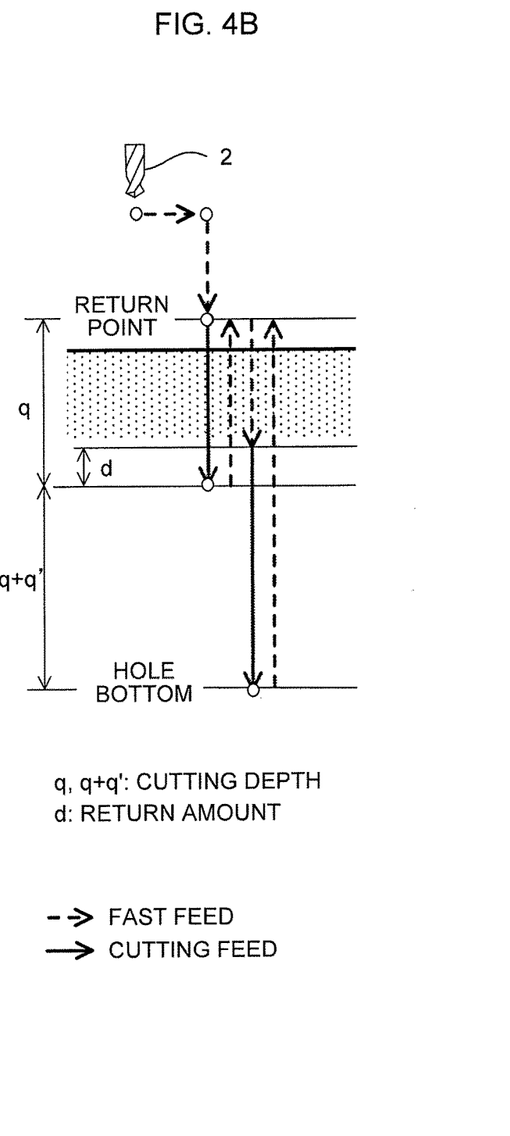

FIGS. 4A and 4B are views for explaining the adjustment method of the cutting depth in each step of the fixed cycle that is different from the adjustment method described above.

In FIGS. 4A and 4B, consideration is given to an example in which a threshold value b of a load torque is used as the condition for the redistribution of the remainder step described in FIGS. 3A and 3B. For example, at the time of the second cut operation in FIG. 4A, in the case where the load torque does not exceed the threshold value b, the cut operation is continued irrespective of the cutting depth. When the cutting depth in the remainder step is sufficiently small, the load torque does not exceed the threshold value until the hole bottom is reached, and it is possible to cut a workpiece up to the hole bottom with the second cut operation, as shown in FIG. 4B. At this point, the total of the movement distance of the cutting in the case of FIG. 4A is $$q+(d+q)+(d+q')=2q+q'+2d,$$

while the total thereof in the case of FIG. 4B is $$q+(d+q+q')=2q+q'+d,$$

and the total of the movement distance of the cutting in the case of FIG. 4B is shorter than that in the case of FIG. 4A by d. In addition, the total of the movement distance of the fast feed in the case of FIG. 4A is $$q+(q-d)+2q+(2q-d)+(2q+q')=8q+q'-2d,$$

while the total thereof in the case of FIG. 4B is $$q+(q-d)+(2q+q')=4q+q'-d,$$

and the movement distance in the case of FIG. 4B is shorter than that in the case of FIG. 4A by 4q−d. Thus, it is possible to reduce the execution time of the fixed cycle correspondingly to reductions in the movement distance of the cutting and the movement distance of the fast feed.

Hereinbelow, a description will be given of the configuration of the numerical controller provided with a program execution unit that executes the above-described adjustment method of the execution order of the individual steps of the fixed cycle or the above-described adjustment method of the cutting depth in each step thereof.

Figure 5:
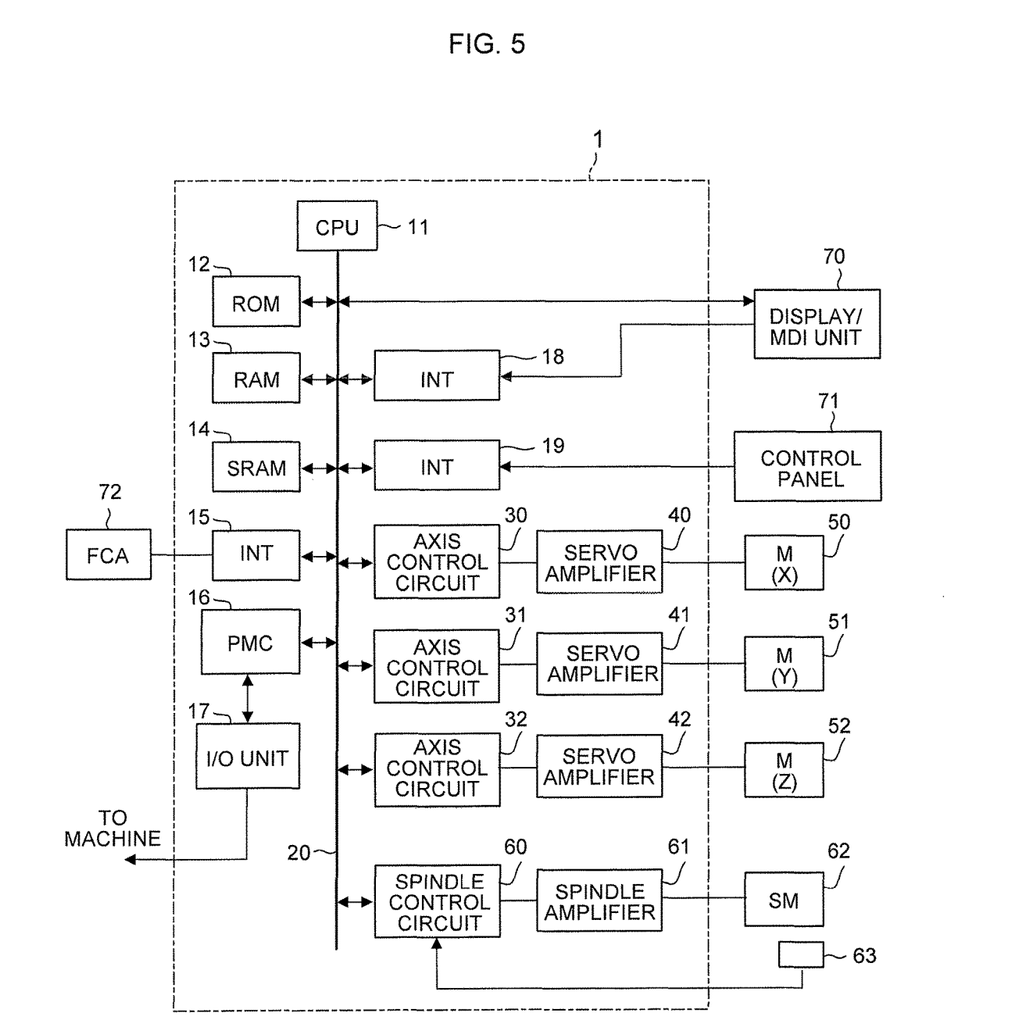
FIG. 5 is a configuration diagram of a principal portion of the numerical controller according to an embodiment of the present invention.

FIG. 5 is a hardware configuration diagram showing a principal portion of the numerical controller of an embodiment of the present invention.

A CPU 11 is a processor that collectively controls a numerical controller 1, and reads a system program stored in a ROM 12 via a bus 20 and controls the entire numerical controller 1 according to the system program. A RAM 13 stores temporary calculation data, display data, and various data items that are input by an operator via a display/MDI unit 70.

An SRAM 14 is configured as a non-volatile memory that is backed up by a battery that is not shown and in which a storage state is maintained even when the power of the numerical controller 1 is turned off. For example, a machining program read via an interface 15 that will be described later, and a machining program input via the display/MDI unit 70 are stored in the SRAM 14. In addition, in the ROM 12, various system programs for executing a process of an edit mode that is needed for the creation and edit of the machining program and an adjustment process of each step of the fixed cycle described above are written in advance. Various machining programs such as the machining program that executes the present invention can be input via the interface 15 and the display/MDI unit 70 and stored in the SRAM 14.

The interface 15 is an interface for connecting the numerical controller 1 to external equipment 72 such as an adaptor. The machining program and various parameters are read from the side of the external equipment 72. In addition, it is possible to store the machining program edited in the numerical controller 1 in an external storage unit via the external equipment 72. A programmable machine controller (PMC) 16 outputs a signal to an auxiliary device of a machine tool (e.g., an actuator such as a robot hand for tool replacement) using a sequence program included in the numerical controller 1 via an I/O unit 17, and controls the auxiliary device thereof. In addition, the PMC 16 receives signals of various switches of a control panel provided in the main body of the machine tool, and passes the signals to CPU 11 after performing required signal processing on the signals.

The display/MDI unit 70 is a manual data input device that includes a display and a keyboard, and an interface 18 receives commands and data from the keyboard of the display/MDI unit 70, and passes them to the CPU 11. An interface 19 is connected to a control panel 71 that includes a manual pulse generator or the like.

Axis control circuits 30 to 32 of individual axes receive movement command amounts of the individual axes from the CPU 11, and output commands for the individual axes to servo amplifiers 40 to 42. Upon receipt of the commands, the servo amplifiers 40 to 42 drive servo motors 50 to 52 of the individual axes. The servo motors 50 to 52 of the individual axes include position/speed detectors, and perform position/speed feedback control in which position/speed feedback signals from the position/speed detectors are fed back to the axis control circuits 30 to 32. Note that, in FIG. 5, the depiction of components related to the position/speed feedback is omitted.

A spindle control circuit 60 receives a spindle rotation command to the machine tool, and outputs a spindle speed signal to a spindle amplifier 61. On receipt of the spindle speed signal, the spindle amplifier 61 rotates a spindle motor 62 of the machine tool at a specified rotation speed to drive the tool.

To the spindle motor 62, a position coder 63 is coupled with a gear, belt or the like, the position coder 63 outputs a feedback pulse in synchronization with the rotation of the spindle, and the feedback pulse is read by the CPU 11.

Figure 6:
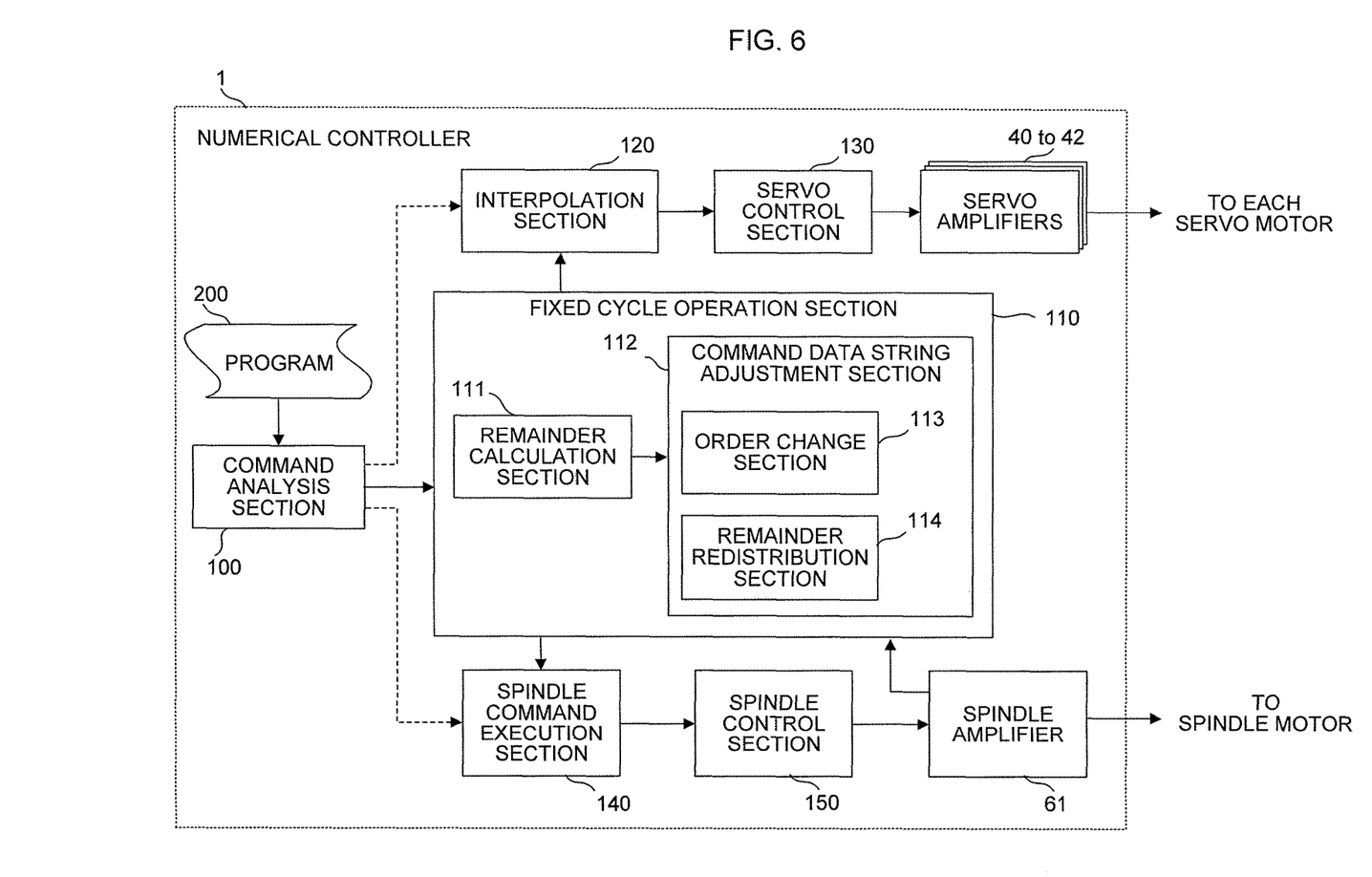
FIG. 6 is a schematic functional block diagram of the numerical controller according to the embodiment of the present invention.

FIG. 6 is a schematic functional block diagram in the case where the above-described adjustment method of the execution order of the individual steps of the fixed cycle or the above-described adjustment method of the cutting depth in each step thereof is implemented in the numerical controller 1 shown in FIG. 5 as a system program.

The numerical controller 1 includes a command analysis section 100, a fixed cycle operation section 110, an interpolation section 120, a servo control section 130, a spindle command execution section 140, and a spindle control section 150, and the fixed cycle operation section 110 includes a remainder calculation section 111 and a command data string adjustment section 112 that includes at least one of an order change section 113 and a remainder redistribution section 114.

The command analysis section 100 successively reads a block from a divided program 200 that is stored in a memory and analyzes the block and, in the case where the analyzed block is a block that orders usual movement, the command analysis section 100 creates command data that orders the movement of each axis based on the analysis result, and outputs the created command data to the interpolation section 120 (a dotted line arrow in the drawing). In addition, in the case where the analyzed block is a block that orders the rotation of the spindle motor 62, the command analysis section 100 creates spindle command data that controls the spindle motor 62 based on the analysis result, and outputs the created spindle command data to the spindle command execution section 140 (a dotted line arrow in the drawing). On the other hand, in the case where the analyzed block is a block that orders the fixed cycle, the command analysis section 100 outputs the analysis result to the fixed cycle operation section 110 (a solid line arrow in the drawing).

The fixed cycle operation section 110 successively generates command data that specifies a tool path based on the analysis result of a fixed cycle command received from the command analysis section 100. The fixed cycle operation section 110 generates a series of command data strings of cutting feed and the fast feed shown in, e.g., FIGS. 1A to 4B. When the fixed cycle operation section 110 generates the command data string, the cutting depth q' of the remainder step is calculated by the remainder calculation section 111, and the command data string adjustment section 112 executes the above-described adjustment method of the individual steps of the fixed cycle described by using FIGS. 1A to 4B based on the calculated cutting depth q' of the remainder step to perform the adjustment of the command data string.

The command data string adjustment section 112 includes at least one of the order change section 113 that executes the adjustment method of the execution order of the individual steps shown in FIGS. 1A and 1B and the remainder redistribution section 114 that executes the adjustment method of the cutting depth in each step shown in FIGS. 3A and 3B and FIGS. 4A and 4B, and performs the adjustment of the command data string by executing one of the adjustment methods that can be applied to the fixed cycle command analyzed by the command analysis section. In the case where it is possible to execute a plurality of the adjustment methods, the command data string adjustment section 112 may select the adjustment method capable of minimizing the execution time of the fixed cycle.

The interpolation section 120 generates, based on the command data output by the command analysis section 100 or the command data string output by the fixed cycle operation section 110, interpolation data obtained by performing interpolation calculation of points on the command path that is specified by the command data or the command data string in an interpolation cycle, performs an acceleration/deceleration process that adjusts the speed of each drive axis in each interpolation cycle on the generated interpolation data, and outputs the acceleration/deceleration adjusted interpolation data to the servo control section 130.

Subsequently, the servo control section 130 controls the drive sections (the servo motors 50 to 52) of the individual axes of a machine serving as a control target based on the output of the interpolation section 120 via the servo amplifiers 40 to 42.

The spindle command execution section 140 generates, based on the spindle command data output by the command analysis section 100 or the spindle command data string output by the fixed cycle operation section 110, data related to rotation/stop of the spindle motor that is ordered by the spindle command data or the spindle command data string, and outputs the generated data to the spindle control section 150.

Subsequently, the spindle control section 150 controls the spindle motor 62 of the machine serving as the control target via the spindle amplifier 61 based on the output of the spindle command execution section 140.

Figure 7:
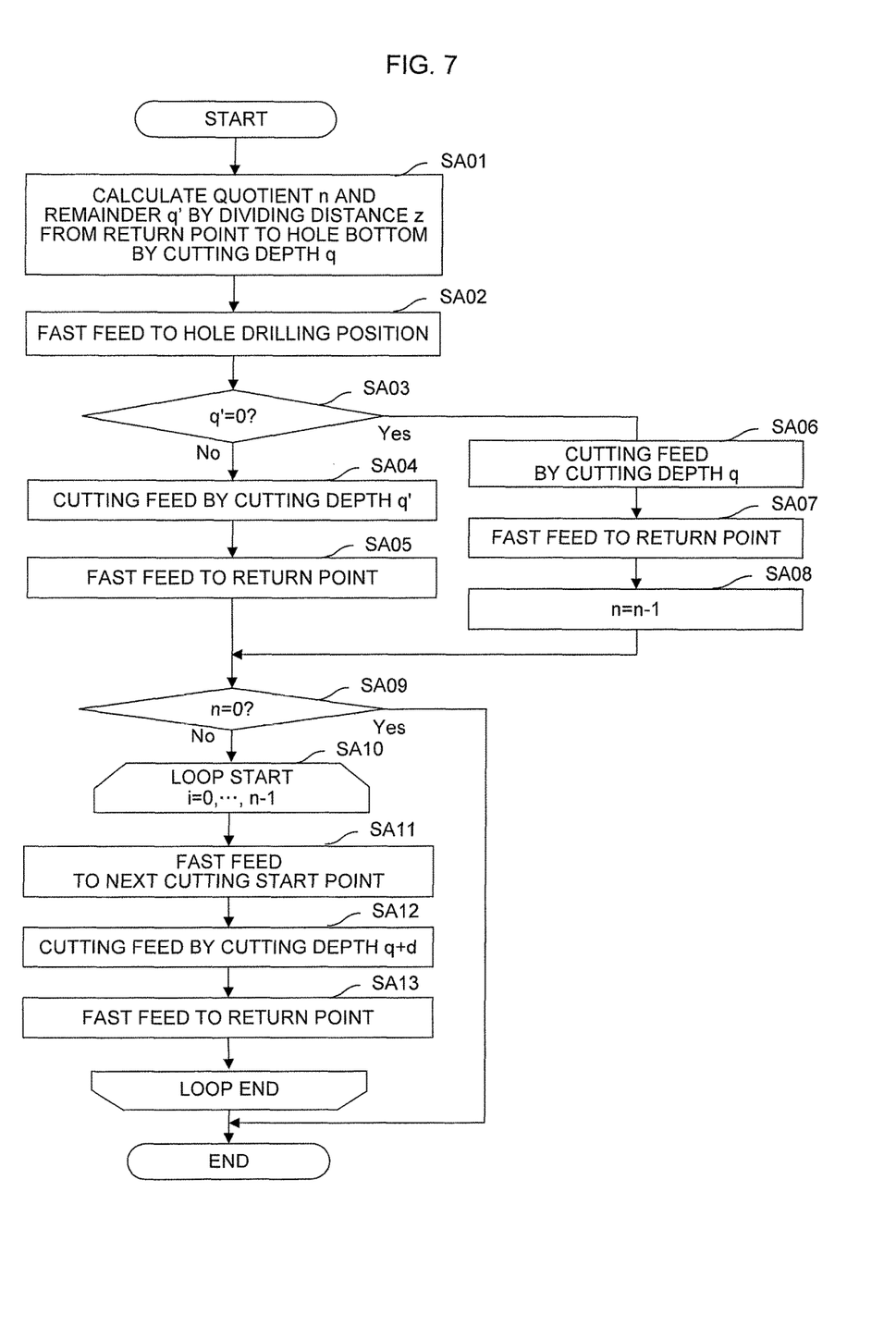
FIG. 7 is a schematic flowchart showing an operation in the case where the adjustment of the execution order of the individual steps of the fixed cycle is performed.

FIG. 7 is a schematic flowchart showing the flow of the operation of the fixed cycle operation section 110 in the case where the adjustment of the execution order of the individual steps of the fixed cycle is performed by the order change section 113 in the command data string adjustment section 112 of the fixed cycle operation section 110. Hereinbelow, the flow will be described according to the individual steps.

[Step SA01] The remainder calculation section 111 calculates a quotient n and a remainder q' by dividing a distance z from the return point to the hole bottom by the cutting depth q (z=n×q+q') according to the command of the block of the fixed cycle, and stores the quotient n and the remainder q' in a memory.

[Step SA02] The order change section 113 commands the fixed cycle operation section 110 to output command data for fast feed of the drill 2 to a hole drilling position first. The fixed cycle operation section 110 outputs the command data according to the command of the order change section 113.

[Step SA03] The order change section 113 determines whether or not the cutting depth q' of the remainder step is 0. The process proceeds to Step SA06 in the case where the cutting depth q' is 0, and the process proceeds to Step SA04 in the case where the cutting depth q' is not 0.

[Step SA04] The order change section 113 commands the fixed cycle operation section 110 to output command data for cutting feed for cutting a workpiece with the cutting depth q'. The fixed cycle operation section 110 outputs the command data according to the command of the order change section 113.

[Step SA05] The order change section 113 commands the fixed cycle operation section 110 to output command data for the fast feed of the drill 2 to the return point. The fixed cycle operation section 110 outputs the command data according to the command of the order change section 113.

[Step SA06] The order change section 113 commands the fixed cycle operation section 110 to output command data for cutting feed for cutting the workpiece with the cutting depth q. The fixed cycle operation section 110 outputs the command data according to the command of the order change section 113.

[Step SA07] The order change section 113 commands the fixed cycle operation section 110 to output the command data for the fast feed of the drill 2 to the return point. The fixed cycle operation section 110 outputs the command data according to the command of the order change section 113.

[Step SA08] The order change section 113 decrements the value of n stored in the memory in Step SA01 by 1.

[Step SA09] The order change section 113 determines whether or not the value of n stored in the memory is 0. The current process is ended in the case where the value of n is 0, and the process proceeds to Step SA10 in the case where the value of n is not 0.

[Step SA10] The order change section 113 repeatedly executes Step SA11 to Step SA13 n times (i=0, 1, . . . n−1, where the value of n is stored in the memory).

[Step SA11] The order change section 13 commands the fixed cycle operation section 110 to output command data for fast feed of the drill 2 to the next cutting start point. The fixed cycle operation section 110 outputs the command data according to the command of the order change section 113.

[Step SA12] The order change section 113 commands the fixed cycle operation section 110 to output command data for cutting feed for cutting the workpiece with the cutting depth q+d. The fixed cycle operation section 110 outputs the command data according to the command of the order change section 113.

[Step SA13] The order change section 113 commands the fixed cycle operation section 110 to output the command data for the fast feed of the drill 2 to the return point. The fixed cycle operation section 110 outputs the command data according to the command of the order change section 113.

Figure 8:
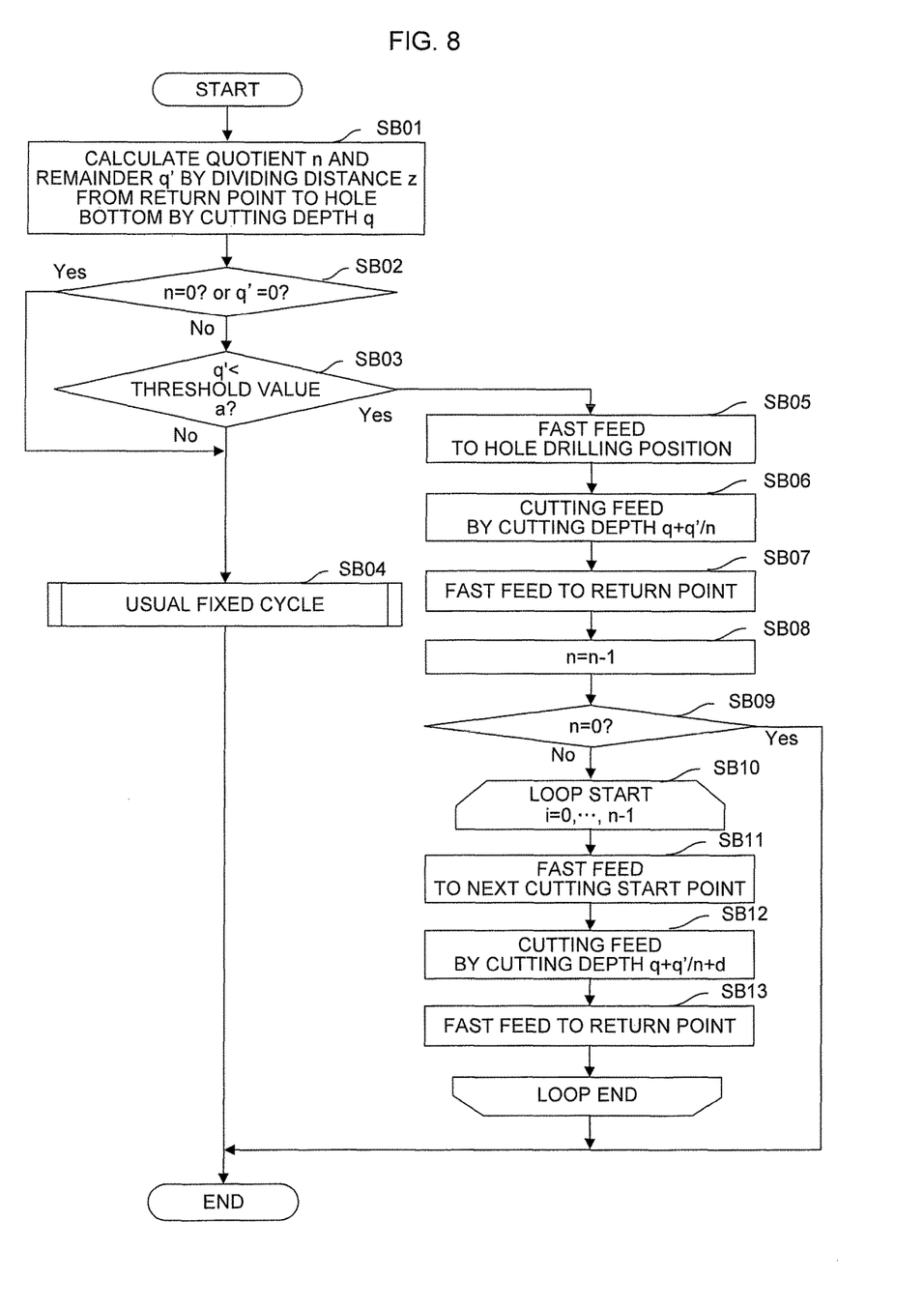
FIG. 8 is a schematic flowchart showing the operation in the case where the adjustment (equal distribution) of the cutting depth in each step of the fixed cycle is performed by using a threshold value of the cutting depth.

FIG. 8 is a schematic flowchart showing the flow of the operation of the fixed cycle operation section 110 in the case where the adjustment (equal distribution) of the cutting depth in each step of the fixed cycle is performed by using the threshold value a of the cutting depth by the remainder redistribution section 114. Hereinbelow, the flow will be described according to the individual steps.

[Step SB01] The remainder calculation section 111 calculates the quotient n and the remainder q' by dividing the distance z from the return point to the hole bottom by the cutting depth q (z=n×q+q') according to the command of the block of the fixed cycle, and stores the quotient n and the remainder q' in the memory.

[Step SB02] The remainder redistribution section 114 determines whether or not one of n and the cutting depth q' of the remainder step that are calculated in Step SB01 is 0. The process proceeds to Step SB04 in the case where one of them is 0, and the process proceeds to Step SB03 in the case where neither of them is 0.

[Step SB03] The remainder redistribution section 114 determines whether or not the cutting depth q' of the remainder step calculated in Step SB01 is less than the preset threshold value a. The process proceeds to Step SB05 in the case where the cutting depth q' is less than the threshold value a, and the process proceeds to Step SB04 in the case where the cutting depth q' is not less than the threshold value a.

[Step SB04] The remainder redistribution section 114 commands the fixed cycle operation section 110 to generate and output the command data string of the usual fixed cycle, and the current process is ended.

[Step SB05] The remainder redistribution section 114 commands the fixed cycle operation section 110 to output the command data for the fast feed of the drill 2 to the hole drilling position first. The fixed cycle operation section 110 outputs the command data according to the command of the remainder redistribution section 114.

[Step SB06] The remainder redistribution section 114 commands the fixed cycle operation section 110 to output command data for cutting feed for cutting the workpiece with the cutting depth q+q'/n. The fixed cycle operation section 110 outputs the command data according to the command of the remainder redistribution section 114.

[Step SB07] The remainder redistribution section 114 commands the fixed cycle operation section 110 to output the command data for the fast feed of the drill 2 to the return point. The fixed cycle operation section 110 outputs the command data according to the command of the remainder redistribution section 114.

[Step SB08] The remainder redistribution section 114 decrements the value of n stored in the memory in Step SB01 by 1.

[Step S309] The remainder redistribution section 114 determines whether or not the value of n stored in the memory is 0. The current process is ended in the case where the value of n is 0, and the process proceeds to Step SB10 in the case where the value of n is not 0.

[Step SB10] The remainder redistribution section 114 repeatedly executes Step SB11 to Step SB13 n times (i=0, 1, . . . n−1, where the value of n is stored in the memory).

[Step SB11] The remainder redistribution section 114 commands the fixed cycle operation section 110 to output the command data for the fast feed of the drill 2 to the next cutting start point. The fixed cycle operation section 110 outputs the command data according to the command of the remainder redistribution section 114.

[Step SB12] The remainder redistribution section 114 commands the fixed cycle operation section 110 to output command data for cutting feed for cutting the workpiece with the cutting depth q+q'/n+d. The fixed cycle operation section 110 outputs the command data according to the command of the remainder redistribution section 114.

[Step SB13] The remainder redistribution section 114 commands the fixed cycle operation section 110 to output the command data for the fast feed of the drill 2 to the return point. The fixed cycle operation section 110 outputs the command data according to the command of the remainder redistribution section 114.

Figure 9A:
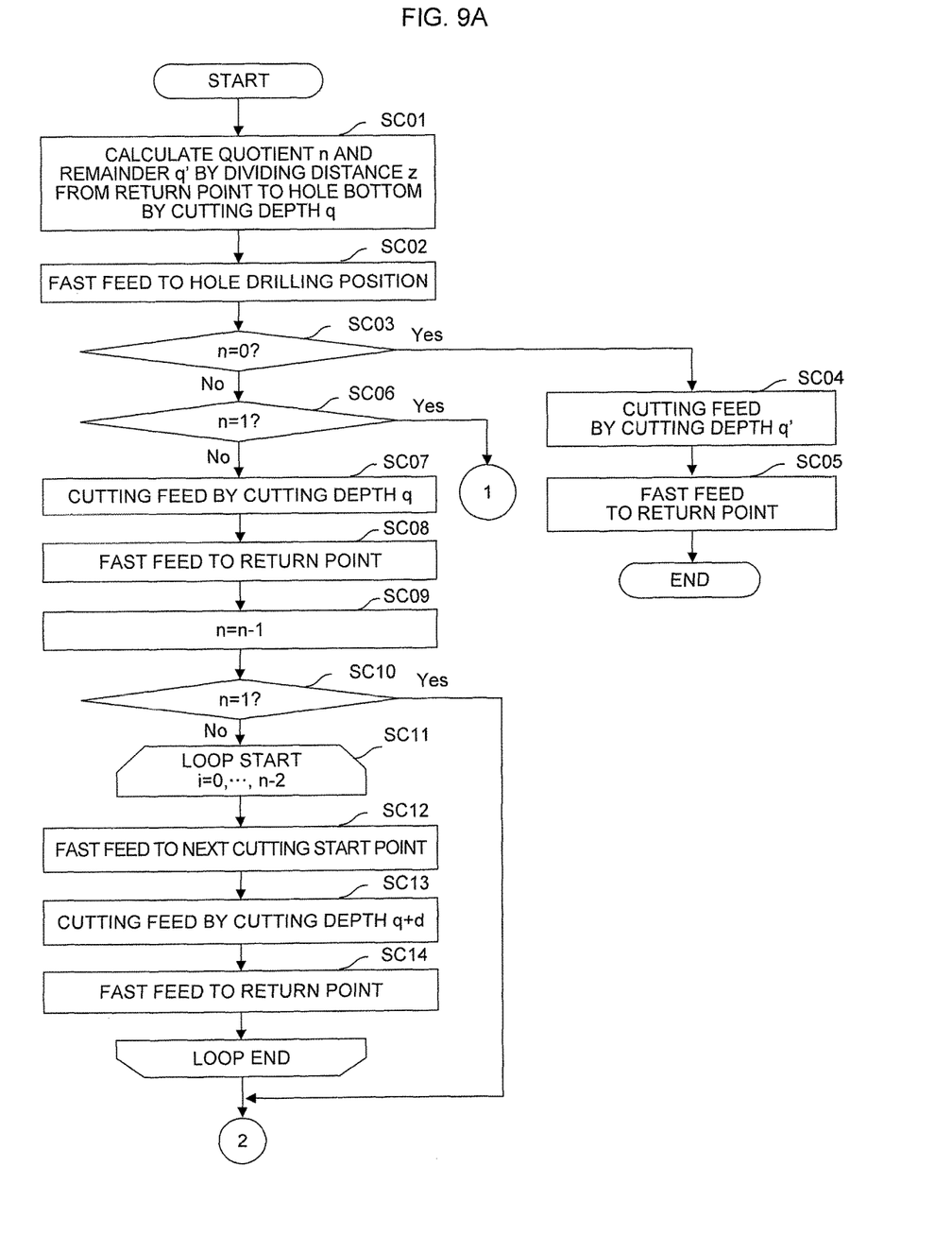
FIG. 9A is a schematic flowchart showing the operation in the case where the adjustment of the cutting depth in each step of the fixed cycle is performed by using a threshold value of a load torque of a spindle motor.
Figure 9B:
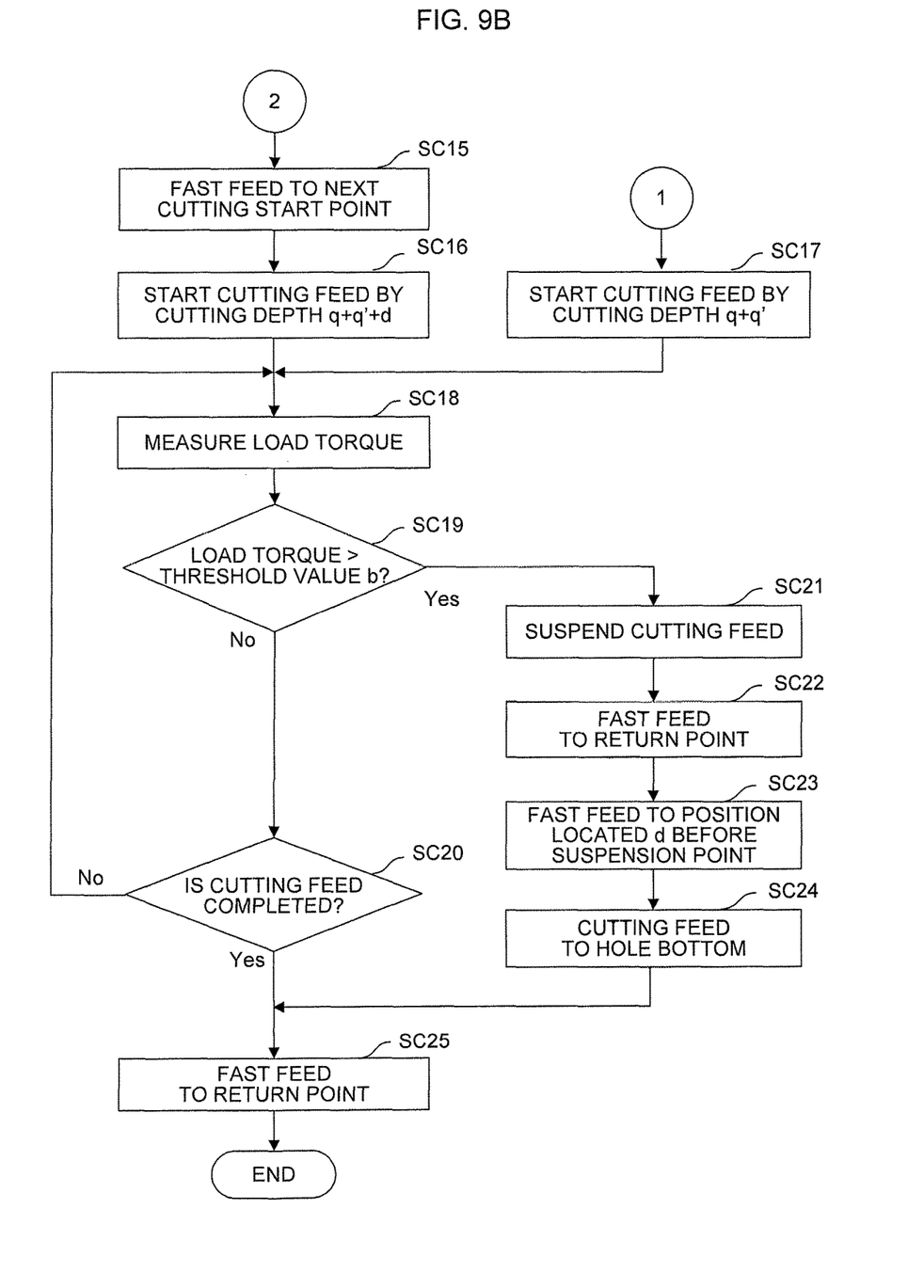
FIG. 9B is the continuance of the flowchart in FIG. 9A.

FIGS. 9A and 9B are schematic flowcharts showing the flow of the operation of the fixed cycle operation section 110 in the case where the adjustment of the cutting depth in each step of the fixed cycle is performed by using the threshold value b of the load torque of the spindle motor 62 by the remainder redistribution section 114. Hereinbelow, the flow will be described according to the individual steps.

[Step SC01] The remainder calculation section 111 calculates the quotient n and the remainder q' by dividing the distance z from the return point to the hole bottom by the cutting depth q (z=n×q+q') according to the command of the block of the fixed cycle, and stores the quotient n and the remainder q' in the memory.

[Step SC02] The remainder redistribution section 114 commands the fixed cycle operation section 110 to output the command data for the fast feed of the drill 2 to the hole drilling position first. The fixed cycle operation section 110 outputs the command data according to the command of the remainder redistribution section 114.

[Step SC03] The remainder redistribution section 114 determines whether or not the value of n stored in the memory is 0. The process proceeds to Step SC04 in the case where the value of n is 0, and the process proceeds to Step SC06 in the case where the value of n is not 0.

[Step SC04] The remainder redistribution section 114 commands the fixed cycle operation section 110 to output the command data for the cutting feed for cutting the workpiece with the cutting depth q'. The fixed cycle operation section 110 outputs the command data according to the command of the remainder redistribution section 114.

[Step SC05] The remainder redistribution section 114 commands the fixed cycle operation section 110 to output the command data for the fast feed of the drill 2 to the return point, and the current process is ended. The fixed cycle operation section 110 outputs the command data according to the command of the remainder redistribution section 114.

[Step SC06] The remainder redistribution section 114 determines whether or not the value of n stored in the memory is 1. The process proceeds to Step SC17 in the case where the value of n is 1, and the process proceeds to Step SC07 in the case where the value of n is not 1.

[Step SC07] The remainder redistribution section 114 commands the fixed cycle operation section 110 to output the command data for the cutting feed for cutting the workpiece with the cutting depth q. The fixed cycle operation section 110 outputs the command data according to the command of the remainder redistribution section 114.

[Step SC08] The remainder redistribution section 114 commands the fixed cycle operation section 110 to output the command data for the fast feed of the drill 2 to the return point, and the current process is ended. The fixed cycle operation section 110 outputs the command data according to the command of the remainder redistribution section 114.

[Step SC09] The remainder redistribution section 114 decrements the value of n stored in the memory in Step SC01 by 1.

[Step SC10] The remainder redistribution section 114 determines whether or not the value of n stored in the memory is 1. The process proceeds to Step SC15 in the case where the value of n is 1, and the process proceeds to Step SC11 in the case where the value of n is not 1.

[Step SC11] The remainder redistribution section 114 repeatedly executes the process from Step SC12 to Step SC14 n−1 times (i=0, 1, . . . n−2, where the value of n is stored in the memory).

[Step SC12] The remainder redistribution section 114 commands the fixed cycle operation section 110 to output the command data for the fast feed of the drill 2 to the next cutting start point. The fixed cycle operation section 110 outputs the command data according to the command of the remainder redistribution section 114.

[Step SC13] The remainder redistribution section 114 commands the fixed cycle operation section 110 to output the command data for the cutting feed for cutting the workpiece with the cutting depth q+d. The fixed cycle operation section 110 outputs the command data according to the command of the remainder redistribution section 114.

[Step SC14] The remainder redistribution section 114 commands the fixed cycle operation section 110 to output the command data for the fast feed of the drill 2 to the return point. The fixed cycle operation section 110 outputs the command data according to the command of the remainder redistribution section 114.

[Step SC15] The remainder redistribution section 114 commands the fixed cycle operation section 110 to output the command data for the fast feed of the drill 2 to the next cutting start point. The fixed cycle operation section 110 outputs the command data according to the command of the remainder redistribution section 114.

[Step SC16] The remainder redistribution section 114 commands the fixed cycle operation section 110 to output command data for cutting feed for cutting the workpiece with the cutting depth of q+q'+d, and the process proceeds to Step SC18. The fixed cycle operation section 110 starts the output of the command data according to the command of the remainder redistribution section 114.

[Step SC17] The remainder redistribution section 114 commands the fixed cycle operation section 110 to output command data for cutting feed for cutting the workpiece with the cutting depth q+q', and the process proceeds to Step SC18. The fixed cycle operation section 110 starts the output of the command data according to the command of the remainder redistribution section 114.

[Step SC18] The remainder redistribution section 114 measures the value of the load torque of the spindle motor 62 that is fed back from the spindle amplifier 61.

[Step SC19] The remainder redistribution section 114 determines whether or not the load torque value of the spindle motor 62 measured in Step SC18 exceeds the preset threshold value b. The process proceeds to Step SC21 in the case where the load torque value exceeds the preset threshold value b, and the process proceeds to Step SC20 in the case where the load torque value does not exceed the preset threshold value b.

[Step SC20] The remainder redistribution section 114 determines whether or not the cutting feed operation based on the command data output from the fixed cycle operation section 110 is completed. The process proceeds to Step SC25 in the case where the cutting feed operation is completed, and the process proceeds to Step SC18 and the measurement of the load torque of the spindle motor 62 is continued in the case where the cutting feed operation is not completed.

[Step SC21] The remainder redistribution section 114 commands the interpolation section 120 to suspend the cutting feed operation, and stores the current axis position in the memory as a suspension point.

[Step SC22] The remainder redistribution section 114 commands the fixed cycle operation section 110 to output the command data for the fast feed of the drill 2 to the return point. The fixed cycle operation section 110 outputs the command data according to the command of the remainder redistribution section 114.

[Step SC23] The remainder redistribution section 114 commands the fixed cycle operation section 110 to output command data for fast feed of the drill 2 to a position located before the suspension point by d. The fixed cycle operation section 110 outputs the command data according to the command of the remainder redistribution section 114.

[Step SC24] The remainder redistribution section 114 commands the fixed cycle operation section 110 to output command data for cutting feed for cutting the workpiece up to the hole bottom, and the process proceeds to Step SC25. The fixed cycle operation section 110 starts the output of the command data according to the command of the remainder redistribution section 114.

[Step SC25] The remainder redistribution section 114 commands the fixed cycle operation section 110 to output the command data for the fast feed of the drill 2 to the return point. The fixed cycle operation section 110 outputs the command data according to the command of the remainder redistribution section 114.

In the numerical controller having the configuration described above, it is possible to reduce the movement distance of the fast feed as compared with the conventional operation even when an operator does not change the cutting depth consciously, and reduce the execution time, and hence, even in the case where the number of times of the cut operation is not changed when the cutting depth is increased, the movement distance of the fast feed is reduced, and it is possible to reduce the execution time. In addition, the remainder step is redistributed when the remainder step can be redistributed, and hence it is possible to reduce the number of times of the cut of the fixed cycle as compared with the conventional operation, and reduce the execution time.

Although the embodiment of the present invention has been described thus far, the present invention is not limited only to the above-described embodiment, and can be carried out in various ways by adding appropriate changes thereto.

The invention claimed is:

1. A numerical controller that generates a command data string including a plurality of command data items based on a fixed cycle command included in a program, and controls a machine based on the command data string, the numerical controller comprising:
   a fixed cycle operation section that analyzes the fixed cycle command and generates the command data string based on an analysis result, wherein
   the fixed cycle operation section includes:
   a remainder calculation section that calculates a remaining cutting depth based on an entire cutting depth of a tool for a workpiece and a cutting depth of the tool for the workpiece in one cut that are specified by the fixed cycle command; and
   a command data string adjustment section that adjusts order of the command data items included in the command data string or cutting depths in the command data items based on the remaining cutting depth such that the total of a feed movement amount of the tool resulting from the command data string is reduced.

2. The numerical controller according to claim 1, wherein the command data string adjustment section includes an order change section that changes the order of the command data items included in the command data string such that command data that orders cutting feed by the remaining cutting depth is executed first.

3. The numerical controller according to claim 1, wherein the command data string adjustment section includes a remainder redistribution section that, in a case where the remaining cutting depth does not exceed a preset first threshold value, distributes the remaining cutting depth to command data that orders cutting feed by the cutting depth of the tool for the workpiece in one cut specified by the fixed cycle command.

4. The numerical controller according to claim 1, wherein the command data string adjustment section includes a remainder redistribution section that measures a load torque of a spindle motor to which the tool is attached when last command data item of the command data string is executed, and adds the remaining cutting depth to a cutting depth in the last command data item in a range in which the load torque does not exceed a preset second threshold value.

* * * * *